United States Patent
Chern et al.

(10) Patent No.: US 9,086,330 B2
(45) Date of Patent: Jul. 21, 2015

(54) TEMPERATURE SENSING CIRCUIT

(71) Applicant: TAIWAN SEMICONDUCTOR MANUFACTURING COMPANY, LTD., Hsinchu (TW)

(72) Inventors: Chan-Hong Chern, Palo Alto, CA (US); Steven Swei, Fremont, CA (US)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 13/915,236

(22) Filed: Jun. 11, 2013

(65) Prior Publication Data

US 2013/0272340 A1    Oct. 17, 2013

Related U.S. Application Data

(63) Continuation of application No. 12/764,532, filed on Apr. 21, 2010, now Pat. No. 8,475,039.

(60) Provisional application No. 61/171,684, filed on Apr. 22, 2009.

(51) Int. Cl.
    *G01K 7/14* (2006.01)
    *G01K 7/01* (2006.01)

(52) U.S. Cl.
    CPC .. *G01K 7/14* (2013.01); *G01K 7/01* (2013.01); *G01K 2219/00* (2013.01)

(58) Field of Classification Search
    CPC .............. G01K 7/02; G01K 7/00; G01K 7/14
    USPC .......................... 374/170–172, 178, 180, 147
    See application file for complete search history.

(56) References Cited

U.S. PATENT DOCUMENTS

| | | | | |
|---|---|---|---|---|
| 6,084,462 A | * | 7/2000 | Barker | 374/E3.002 |
| 6,183,131 B1 | * | 2/2001 | Holloway et al. | 374/172 |
| 6,337,603 B1 | | 1/2002 | Kinugasa et al. | |
| 7,362,248 B2 | * | 4/2008 | McClure et al. | 341/141 |
| 7,540,657 B2 | * | 6/2009 | Mikuni et al. | 374/178 |
| 7,792,167 B2 | * | 9/2010 | Kanesaka | 372/38.07 |

(Continued)

FOREIGN PATENT DOCUMENTS

| | | |
|---|---|---|
| JP | 2001-13011 | 1/2001 |
| JP | 2006-279012 | 10/2006 |

(Continued)

OTHER PUBLICATIONS

OA dated Jul. 24, 2012 from corresponding application No. JP 10-2010-0037560.

(Continued)

*Primary Examiner* — Yaritza Guadalupe-McCall
(74) *Attorney, Agent, or Firm* — Lowe Hauptman & Ham, LLP

(57) ABSTRACT

A circuit includes a comparator, a first circuit, and a second circuit. The comparator has a first input node and a second input node. The first circuit is configured to output a temperature-dependent voltage at the first input node of the comparator. The first circuit includes a current mirror configured to generate a first reference voltage. The second circuit is configured to output a second reference voltage at the second input node of the comparator responsive to a digital code and the first reference voltage.

20 Claims, 12 Drawing Sheets

(56) References Cited

U.S. PATENT DOCUMENTS

| | | | |
|---|---|---|---|
| 7,896,545 B2* | 3/2011 | Pan | 374/178 |
| 8,206,031 B2* | 6/2012 | Anzai | 374/173 |
| 8,262,286 B2* | 9/2012 | Peterson et al. | 374/170 |
| 8,398,304 B2* | 3/2013 | Campos et al. | 374/178 |
| 8,475,039 B2* | 7/2013 | Chern et al. | 374/170 |
| 8,596,864 B2* | 12/2013 | Peterson | 374/171 |
| 8,646,969 B2* | 2/2014 | Pan | 374/178 |
| 2006/0229839 A1 | 10/2006 | Butler | |
| 2007/0146056 A1* | 6/2007 | McClure et al. | 327/537 |
| 2007/0216468 A1 | 9/2007 | Duarte | |
| 2008/0191917 A1* | 8/2008 | McClure et al. | 341/144 |
| 2009/0238239 A1* | 9/2009 | Pan | 374/178 |
| 2010/0002747 A1* | 1/2010 | Bosch et al. | 374/170 |
| 2010/0124251 A1* | 5/2010 | Peterson et al. | 374/171 |
| 2010/0141329 A1* | 6/2010 | Kim | 374/170 |
| 2010/0271246 A1* | 10/2010 | Chern et al. | 341/147 |
| 2011/0096809 A1* | 4/2011 | Campos et al. | 374/178 |
| 2011/0158286 A1* | 6/2011 | Peterson | 374/170 |
| 2011/0255568 A1* | 10/2011 | Swei | 374/180 |
| 2011/0285469 A1* | 11/2011 | Mosalikanti et al. | 331/108 D |
| 2012/0224605 A1* | 9/2012 | Pan | 374/178 |
| 2013/0058378 A1* | 3/2013 | Zambetti et al. | 374/185 |
| 2013/0272340 A1* | 10/2013 | Chern et al. | 374/171 |

FOREIGN PATENT DOCUMENTS

| | | |
|---|---|---|
| TW | I276788 | 3/2007 |
| TW | I282050 | 6/2007 |

OTHER PUBLICATIONS

Swei, Steven et al., "High-Precision Temperature Sensor Apparatus and Method (Embodiment with a PTAT Temperature Measuring Circuitry)", TSMC, Ltd. 2007.

Duarte, David E., et al., "Temperature Sensor Design in a High Volume Manufacturing 65nm CMOS Digital Process", IEEE 2007, Custom Integrated Circuits Conference (CICC), pp. 221-224.

OA dated Mar. 21, 2012 from corresponding application No. JP 2010-098889.

Office Action dated Aug. 12, 2013 from corresponding application No. TW 099112635.

\* cited by examiner

| L | $M_{40}$ | $M_{41}$ | $M_{42}$ | $M_{43}$ |
|---|---|---|---|---|
| 0 | ON | OFF | OFF | OFF |
| 1 | ON | ON | OFF | OFF |
| 2 | ON | ON | ON | OFF |
| 3 | ON | ON | ON | ON |

1100

| L | $CT_0$ | $CT_1$ | $CT_2$ | $CT_3$ |
|---|---|---|---|---|
| 0 | 0 | 1 | 1 | 1 |
| 1 | 0 | 0 | 1 | 1 |
| 2 | 0 | 0 | 0 | 1 |
| 3 | 0 | 0 | 0 | 0 |

1200

TEMPERATURE SENSING CIRCUIT

CROSS-REFERENCE TO RELATED APPLICATIONS

The present application is a continuation of U.S. application Ser. No. 12/764,532, filed Apr. 21, 2010, which claims the priority of U.S. Provisional Application No. 61/171,684, filed on Apr. 22, 2009, which are incorporated herein by reference in their entireties.

TECHNICAL FIELD

Embodiments of the disclosure are related to generating linear relationship between temperatures and digital codes. Various embodiments are used in temperature sensors.

BACKGROUND

A temperature sensor can be used to monitor temperature of an electronic component such as a CPU (Central Processing Unit), GPU (Graphics Processing Unit), MPU (Micro Processing Unit), SOC (System On Chip), etc. When the temperature exceeds predetermined thresholds, the sensor may alert a circuitry to slow down or even shut down the unit to reduce power consumption and thus reduce the temperature so that overheating that can cause destructive failure to the unit may be prevented.

Typically, temperature sensors include a reference circuitry and a temperature measuring circuitry wherein the temperature dependency is either proportional to absolute temperature (PTAT), that is, the measuring circuit outputs a voltage that increases in proportion to a temperature rise or has a positive temperature coefficient, or complementary to absolute temperature (CTAT), that is, the measuring circuit outputs a voltage that drops in proportion to a temperature rise or has a negative temperature coefficient. Further, DAC (digital to analog converter) based temperature sensors relying on comparing a PTAT voltage and a CTAT base-emitter voltage may be used. This approach, however, suffers from DAC code-to-temperature non-linearity issues, i.e., it cannot achieve good linearity over a wide temperature range, resulting in poor temperature measurement accuracy.

In some approaches involving a CTAT voltage, the compared voltage varies with high temperature coefficient over the design temperature range. When the compared voltage is PTAT, the implementation scheme introduces an intrinsic DAC code-to-temperature nonlinearity, and, as a result, suffers from poor temperature measurement accuracy unless an extensive temperature calibration (e.g., many-point calibration) is performed. Other approaches trying to cause the compared (or reference) voltage family curves to be parallel, and thus better DAC code-to-temperature linearity, are far from successful because the curves, in reality, are not parallel. These approaches therefore also suffer from poor temperature measurement accuracy.

BRIEF DESCRIPTION OF THE DRAWINGS

The details of one or more embodiments are set forth in the accompanying drawings and the description below. Other features and advantages of the disclosure will be apparent from the description, drawings, and claims.

Like reference symbols in the various drawings indicate like elements.

DETAILED DESCRIPTION

Figure 1:
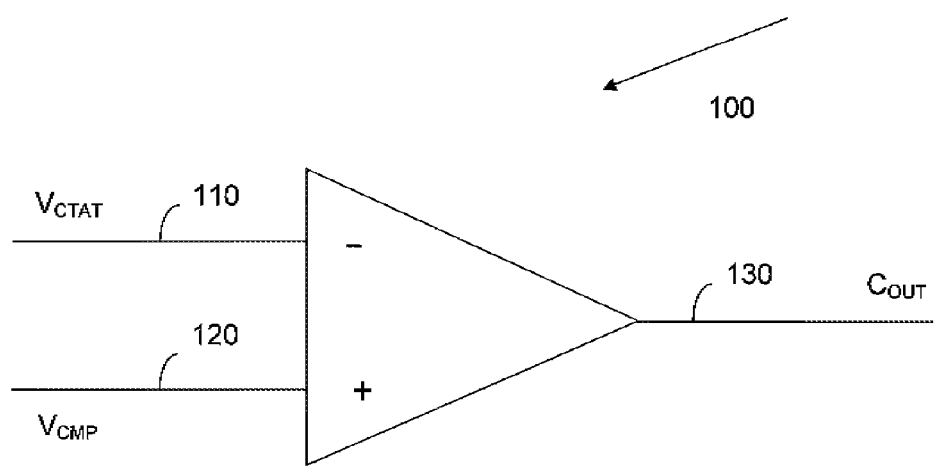
FIG. 1 shows a circuit 100 related to a CTAT-type implementation in accordance with an embodiment.

Some embodiments of the disclosure relate to providing linear relationship between temperatures and digital codes. Various embodiments are used in temperature sensors. In some embodiments, at a particular temperature (e.g., operational temperature of a semiconductor device), a circuit (e.g., temperature sensing circuit) in the sensor provides a temperature dependent reference voltage, e.g., $V_{CTAT}$ and a compared voltage, e.g., $V_{CMP}$, to a comparator. $V_{CTAT}$ depends on temperature as complement to absolute temperature. The compared voltage $V_{CMP}$ is generated having DAC codes as inputs. If $V_{CTAT}$ and $V_{CMP}$ are equal (e.g., substantially equal), then the comparator output so indicates, e.g., by providing a true logic. If $V_{CTAT}$ and $V_{CMP}$ are not equal, then the comparator output is provided to another circuit (e.g., an adjusting circuit) that varies the DAC codes until $V_{CTAT}$ and $V_{CMP}$ are equal. In effect, at a particular point in time, the temperature experienced by the temperature sensing circuit corresponds to a DAC code when $V_{CTAT}$ and $V_{CMP}$ are equal. In various embodiments, the various temperatures experienced by the temperature sensing circuit and the DAC codes are substantially linearly related. Other embodiments and embodiments related to a voltage that depends on temperature as proportional to absolute temperature (e.g., $V_{PTAT}$) are also disclosed.

Embodiments of the disclosure can have one or a combination of the following features and/or advantages. Embodiments of the temperature sensing circuit can be integrated in semiconductor circuitry manufactured by advanced CMOS (Complementary Metal Oxide Semiconductor) processes. The linear relationship between the temperatures and the DAC codes increases accuracy of the temperature sensing circuitry and allows simple temperature calibration that, in turn, enables accurate temperature sensing.

Embodiments, or examples, illustrated in the drawings are now described using specific language. It will nevertheless be understood that no limitation of the scope of the invention is thereby intended. Any alterations and modifications in the described embodiments, and any further applications of principles described in this document are contemplated as would normally occur to one skilled in the art to which the disclosure relates. Reference numbers may be repeated throughout the embodiments, but this does not necessarily require that features of one embodiment apply to another embodiment, even if they share the same reference number.

Voltage Dependent on Temperature as Complementary to Absolute Temperature ($V_{CTAT}$)

FIG. 1 shows a comparator 100 in accordance with an embodiment related to a CTAT-type implementation. Reference voltage $V_{CTAT}$ on line 110 and compared voltage $V_{CMP}$ on line 120 are generated by a circuit (e.g., temperature sensing circuit) that will be described below. Comparator 100 compares voltages $V_{CMP}$ and $V_{CTAT}$, and provides resulting signal $C_{OUT}$ on line 130. In various embodiments, $V_{CMP}$ is a voltage that varies with a very small or insignificant temperature coefficient over a wide temperature range. Further, various $V_{CMP}$ values are generated with DAC (digital-to-analog converter) codes as inputs. $V_{CTAT}$ is a complementary to absolute temperature (CTAT) reference voltage and is generated by the temperature sensing circuit at a corresponding temperature. For example, in an application, the temperature sensing circuit is embedded as part of a sensor in a semiconductor device, e.g., a CPU. At operation, the CPU experiences a particular temperature (e.g., operational temperature) that is also experienced by the temperature sensing circuit, and $V_{CTAT}$ is generated having this temperature as an input. In some embodiments, $V_{CMP}$ is initially lower than $V_{CTAT}$, and $C_{OUT}$ is false (e.g., having a low logic). $V_{CMP}$ is then increased until $V_{CMP}$ is slightly higher than (e.g., substantially equal to) $V_{CTAT}$ then $C_{OUT}$ is true (e.g., having a high logic). When $V_{CMP}$ is lower than $V_{CTAT}$, signal $C_{OUT}$ is provided to another circuit (e.g., an adjusting circuit (not shown)) that changes the DAC codes which in turn change $V_{CMP}$ until $V_{CMP}$ is slightly higher than (e.g., substantially equal to) $V_{CTAT}$. In effect, when $V_{CMP}$ is equal to $V_{CTAT}$, the temperature experienced by the CPU and the temperature sensing circuit, e.g., temperature $T_0$, is also the temperature at which the temperature sensing circuit provides $V_{CTAT}$. Further, this temperature $T_0$ corresponds to a DAC code, e.g., DAC code $C_0$. In various embodiments, the temperatures at which the temperature sensing circuit provides $V_{CTAT}$ and the DAC codes are substantially linearly related. Those skilled in the art will recognize that when the temperatures and the DAC codes are linearly related, the graph representing their relationship on a two dimensional axis is a straight line.

$V_{CTAT}$, $V_{CMP}$ and Corresponding Temperatures

Figure 2:
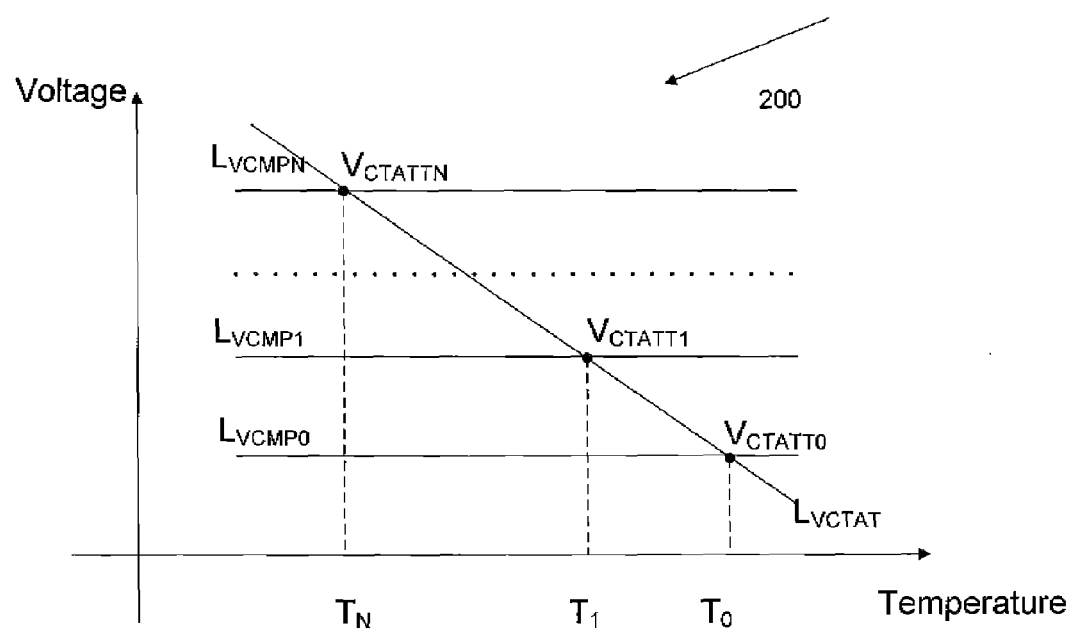
FIG. 2 shows a graph 200 illustrating the relationship between temperature and various voltages in accordance with the CTAT-type embodiments.

FIG. 2 shows a chart 200 illustrating the relationship between $V_{CTAT}$, $V_{CMP}$, and temperatures T, in accordance with an embodiment. Each line $L_{VCMP}$ (including $L_{VCMP0}$, $L_{VCMP1}$, $L_{VCMPN}$, etc.) shows the relationship between a voltage $V_{CMP}$ and temperature T at a particular DAC code serving as an input for $V_{CMP}$ to be generated. Each line $L_{VCMP}$ can be generated by obtaining various values of $V_{CMP}$ at various temperatures (e.g., operational temperatures of a CPU at different time points). In various embodiments, a line $L_{VCMP}$ is substantially independent of temperature. Varying the DAC codes from the least significant bit (LSB) to the most significant bit (MSB) provides lines $L_{VCMP}$. For example, if the DAC receives a 2-bit input, e.g., Input (0:1), varying bits 0 to 1 provides 4 DAC codes that correspond to 4 lines $L_{VCMP}$. If the DAC receives a 3-bit input, e.g., Input (0:2), varying bits 0 to 2 provides 8 DAC codes that correspond to 8 lines $L_{VCMP}$, etc. Further, line $L_{VCMP0}$ corresponds to a code $C_0$, and shows the relationship between voltage $V_{CMP}$ and temperature T at code $C_0$. Line $L_{VCMP1}$ corresponds to code $C_1$, and shows the relationship between voltage $V_{CMP}$ and temperature T at code $C_1$. Line $L_{VCMPN}$ corresponds to code N, and shows the relationship between voltage $V_{CMP}$ and temperature T at code $C_N$, etc. In accordance with some embodiments, due to the nature of very small or insignificant temperature coefficient for $V_{CMP}$, lines $L_{VCMP}$ are very close to parallel (e.g., substantially parallel) to one another in addition to being substantially straight although not necessarily parallel to the x-axis. Based on the parallelism of lines $L_{VCMP}$ and their being straight lines, embodiments provide linearity between the temperatures T and the DAC codes.

Line $L_{VCTAT}$ shows the relationship between $V_{CTAT}$ and temperature T. Those skilled in the art will recognize that line $L_{VCTAT}$ has a negative slope and indicates that $V_{CTAT}$ has a negative temperature coefficient. The intersection between line $L_{VCTAT}$ and a line $L_{VCMP}$ indicates that $V_{CTAT}$ equals to $V_{CMP}$ at a particular temperature T that corresponds to a particular DAC code C. For example, point $V_{CTATT0}$ indicates $V_{CTAT}$ equals to $V_{CMP}$ at a temperature $T_0$ that corresponds to a DAC code $C_0$. Similarly, point $V_{CTATT1}$ indicates $V_{CTAT}$ equals to $V_{CMP}$ at a temperature $T_1$ that corresponds to DAC code $C_1$, and $V_{CTATTN}$ indicates $V_{CTAT}$ equals to $V_{CMP}$ at a temperature $T_N$ that corresponds to a DAC code $C_N$, etc. In various embodiments, each point $V_{CTATT}$ corresponds to the result in comparator 100 where $V_{CMP}$ and $V_{CTAT}$ are equal, e.g., when signal $C_{OUT}$ is true, at a particular temperature T experienced by the temperature sensing circuit.

Temperatures and DAC Codes—CTAT-type

Figure 3:
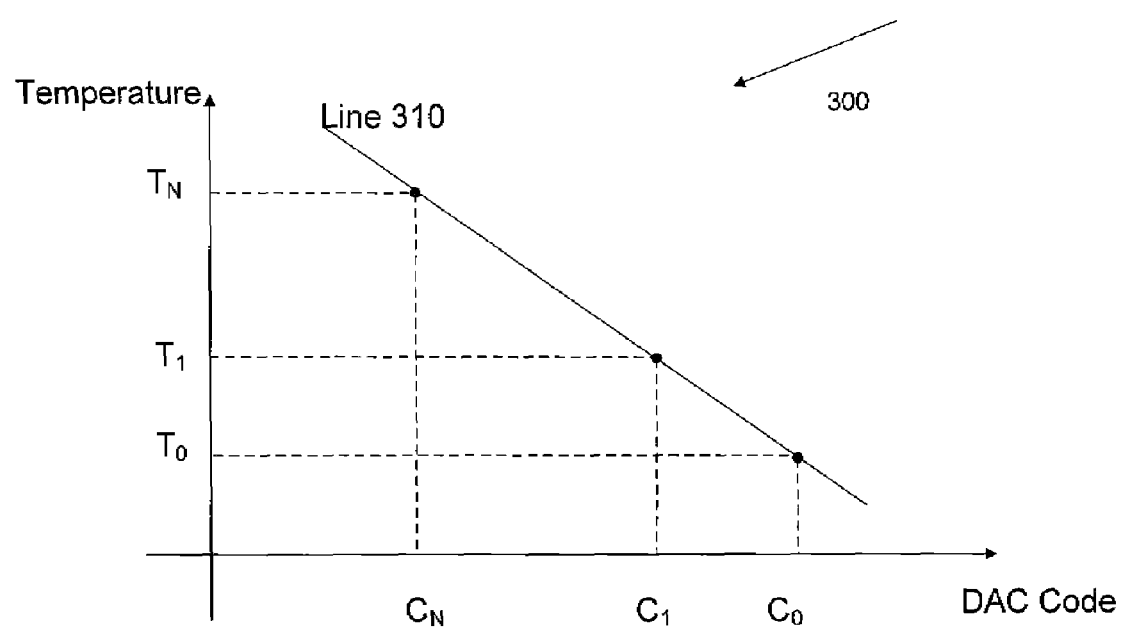
FIG. 3 shows a graph 300 illustrating the relationship between the DAC code and temperature in accordance with the CTAT-type embodiments.

FIG. 3 shows a graph 300 with a line 310 indicating the relationship between temperatures T and DAC codes C related to $V_{CTAT}$. For example, $T_0$ corresponds to code $C_0$, $T_1$ corresponds to code $C_1$, $T_N$ corresponds to code $C_N$, etc.

Embodiments provide the linearity between temperatures T and DAC codes C as much as possible, which is advantageous over prior art approaches that do not provide such linearity. This linearity results from the fact that lines $L_{VCMP}$ in FIG. 2 are substantially straight and substantially parallel to one another but do not need to be parallel to the x-axis. In a 100% linearity situation, lines $L_{VCMP}$ are 100% straight and thus 100% parallel to one another, which results in a line 310 being 100% straight. In other approaches lines $L_{VCMP}$ are curved and/or not parallel to one another, which also causes line 310 to be curved. Those skilled in the art will recognize that the less curved the line 310 is, the more linear the relationship between the temperatures T and the DAC codes is. Embodiments of the disclosure are advantageous, especially in high volume manufacturing environment because graph 300, once established, provides the linear relationship between the DAC codes C and temperatures T on line 310. As a result, corresponding temperatures T and DAC codes C can be easily identified. For example, given a DAC code C on the horizontal axis, a corresponding temperature T on the vertical axis can be identified using line 310. Similarly, given a temperature T on the vertical axis, a corresponding DAC code on the horizontal axis can be identified using line 310.

In an application, line 310 can be easily and economically established in a simple calibration process near room temperature based on the linear relationship between temperatures T and DAC codes C. For example, a temperature sensor embodying a circuit 400 or 500 (e.g., the temperature sensing circuit) is subject to a first known temperature, e.g., temperature $T_1$. Corresponding to temperature $T_1$, a DAC code, e.g., code $C_1$, is identified. The temperature sensing circuit is then subject to a second known temperature, e.g., temperature $T_2$. Corresponding to temperature $T_2$, a DAC code, e.g., code $C_2$ is identified. Based on the linear relationship between temperatures T and DAC codes C, temperatures $T_1$ and $T_2$, and DAC codes $C_1$ and $C_2$, line 310 can be readily established by various techniques known in the art, and embodiments of the disclosure are not limited to a particular technique. In a further application, for example, line 310, once established, is analyzed to program a control circuit that can regulate temperatures T in a semiconductor chip using embodiments of the disclosure. For example, if a DAC code, e.g., code C75, would be identified at a particular operational moment of the chip, then this code C75 corresponds to a temperature, e.g., temperature T75 at 75° C. Because this temperature T75 at 75° C. indicates, for example, that the chip is running at 400 MHz and thus generates too much heat, the control circuit is programmed for the chip to run at a slower rate, e.g., 300 MHz to reduce the generated heat. Similarly, if a DAC code, e.g., code C100, is identified, then this code corresponds to a temperature, e.g., temperature T100 at 100° C. Because this temperature T100 at 100° C. can, for example, damage the chip, the control circuit is programmed to shut down the chip when it recognizes code C100. The above examples are used to illustrate applications of the disclosure, and the disclosure is not limited to any particular example.

Circuit Providing $V_{CTAT}$ and $V_{CMP}$—1st Embodiment

Figure 4:
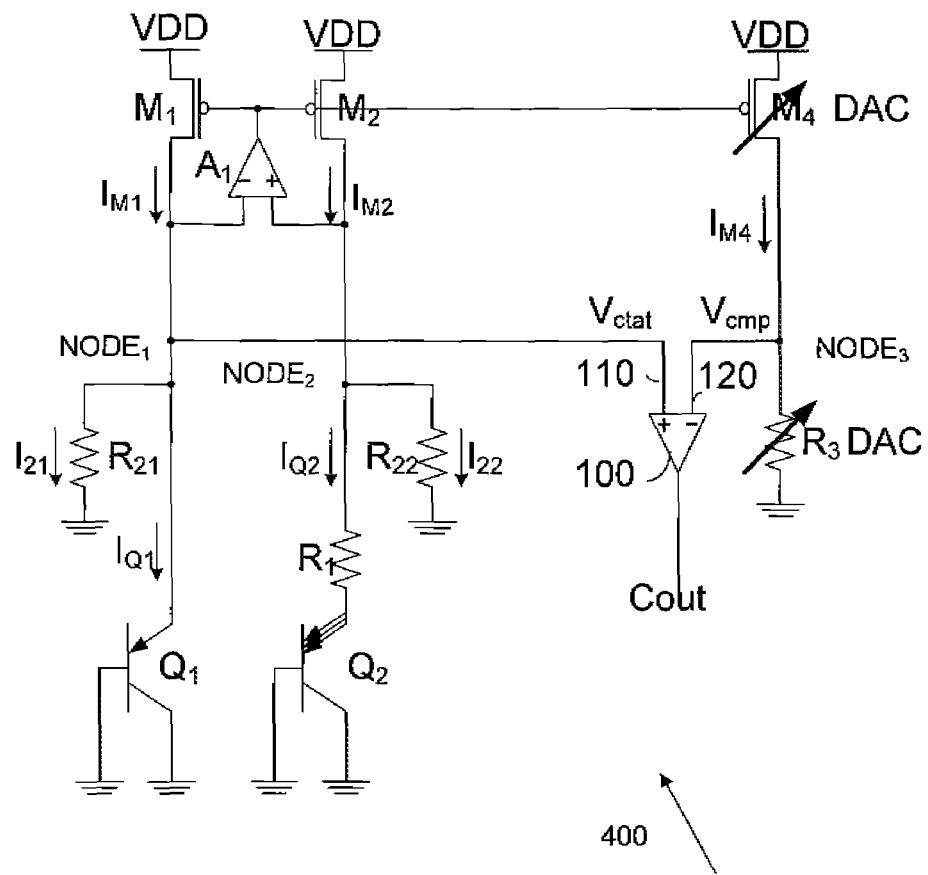
FIG. 4 shows a circuit 400 used to create $V_{CTAT}$ and $V_{CMP}$ in accordance with a first embodiment.

FIG. 4 shows a circuit 400 providing $V_{CTAT}$ and $V_{CMP}$, in accordance with a first embodiment. For illustration purposes, FIG. 4 also includes comparator 100. $V_{CMP}$, going through circuit 400 having a negative temperature coefficient circuit component canceling the temperature effect with a positive temperature coefficient circuit component results in a low or insignificant temperature coefficient.

Transistors $M_1$, $M_2$ and amplifier $A_1$ constitute a current mirror wherein amplifier $A_1$ equalizes current $I_{M1}$ and $I_{M2}$ and voltages at $NODE_1$ and $NODE_2$. Because $I_{M1}$ equals to $I_{M2}$, $I_M$, for illustration purposes, is used to refer to either $I_{M1}$ or $I_{M2}$. At node NODE1 $I_{M1}=I_{21}+I_{Q1}$ while at node $NODE_2$ $I_{M2}=I_{Q2}+I_{22}$. Bipolar transistor $Q_1$ is configured as a diode because a diode has negative temperature coefficient. $V_{CTAT}$ is in fact $V_{BE}$ (voltage from the base to emitter) of transistor $Q_1$, and, for illustration purpose, is referred to as $V_{BEQ1}$. Bipolar transistor $Q_2$ is also configured as a diode, and for illustration purposes, the voltage across the base and emitter of transistor $Q_2$ is referred to as $V_{BEQ2}$. In the embodiment of FIG. 4, CMOS technology is used and transistors $Q_1$ and $Q_2$ are implemented as diodes. Embodiments of the disclosure, however, can use diodes, instead of transistors, or any other devices that their operation depends on temperature. Two resistors $R_{21}$ and $R_{22}$ provide current paths for two currents $I_{21}$ and $I_{22}$ as shown. Because, in the embodiment of FIG. 4, $R_{21}=R_{22}$, either resistor $R_{21}$ or $R_{22}$ may be referred to as $R_2$. Similarly, because $I_{21}=I_{22}$ either current $I_{21}$ or $I_{22}$ may be referred to as $I_2$. Resistor $R_{21}$ is in parallel with transistor $Q_1$ while resistor $R_{22}$ is in parallel with the series of resistor $R_1$ and transistor $Q_2$. $V_{CTAT}$ is the voltage at $NODE_1$ and also the voltage across $V_{BE}$ of transistor $Q_1$ (e.g., $V_{BEQ1}$) such that it has a negative temperature coefficient. The voltage across resistor $R_1$ is the voltage difference between $V_{BEQ1}$ and $V_{BEQ2}$. As a result, it has a positive temperature coefficient. DAC resistors $R_3$ or DAC current $I_{M4}$ provide voltage $V_{CMP}$ wherein $V_{CMP}=I_{M4}*R_3$ at a particular value for $I_{M4}$ or $R_3$. In accordance with some embodiments, $V_{CMP}$ is an insignificant temperature dependent voltage. To obtain different values of $V_{CMP}$, different values for DAC current $I_{M4}$ and/or $R_3$ are obtained by varying the DAC codes corresponding to each current $I_{M4}$ or varying resistor $R_3$.

DAC transistors $M_4$ indicate that each current $I_{M4}$ provided by a configuration of DAC transistors $M_4$ corresponds to a DAC code. Further, DAC transistors $M_4$ provide a mirrored current $I_{M4}$ that multiplies current $I_M$. That is, $I_{M4}=N*I_M$ where N is the multiplication factor. In the embodiment of FIG. 4, a DAC circuitry controls DAC transistors $M_4$. That is, a digital value of the DAC circuitry corresponds to a value of current $I_{M4}$. For illustration purposes, if the DAC circuitry includes M number of input bits, and N numbers of outputs, then $N=2^M$. For example, if M=2 then $N=2^2$ or 4. If M=3 then $N=2^3$ or 8. If M=4, then $N=2^4$ or 16, etc. Some embodiments vary the DAC codes to obtain different values of $I_{M4}$ and, effectively, different $V_{CMP}$. In an embodiment, changing the number of active transistors in DAC transistors M4 changes the DAC codes and thus changes the value of N. Changing the value of N in turn changes the values of current $I_{M4}$. For example, a 2-bit DAC (M=2) results in N=4 ($2^2$) and thus 4 $I_{M4}$ values, a 3-bit DAC (M=3) results in N=8 ($2^3$) and thus 8 $I_{M4}$ values, and a 4-bit DAC (M=4) results in N=16 ($2^4$) and thus 16 $I_{M4}$ values, etc. Further, because voltage $V_{CMP}$ depends on current $I_{M4}$ ($V_{CMP}=I_{M4}*R_3$), if current $I_{M4}$ is provided by a DAC with 4 values, e.g., $I_{M4}(0:3)$, then $V_{CMP}$ corresponds to 4 values $V_{CMP}(0:3)$. If current $I_{M4}$ is provided by a DAC with 8 values, e.g., $I_{M4}(0:7)$, then $V_{CMP}$ corresponds to 8 values $V_{CMP}(0:7)$. If current $I_{M4}$ is provided by a DAC with 16 values, e.g., $I_{M4}(0:15)$, then $V_{CMP}$ corresponds to 16 values $V_{CMP}(0:15)$, etc.

DAC resistors $R_3$ indicate that the values of resistor $R_3$ can also be varied by DAC codes. Similar to the situation of DAC transistors $M_4$, an M-bit input DAC provides N outputs where $N=2^M$. Further, if this DAC controls DAC resistors $R_3$, then N numbers of DAC codes (e.g., N numbers of DAC outputs) correspond to N values of resistor $R_3$. Additionally, because $V_{CMP}=IM4*R_3$, each value of resistor $R_3$ corresponding to a DAC code also corresponds to a value of $V_{CMP}$, similar to the DAC transistors $M_4$ explained above. Some embodiments vary the DAC codes to vary the value of $R_3$, and, effectively, $V_{CMP}$. Those skilled in the art will recognize that there are many known techniques to provide various values of $V_{CMP}$ using variations of resistors $R_3$ through DAC codes, and embodiments of the disclosure are not limited to a particular technique.

At node NODE3, because the input impedance of comparator 100 is significantly high, the current on line 120 is insignificant and can be disregarded. As a result:

$V_{CMP}=I_{M4}*R_3$

Because $I_{M4}=N*I_M$, $V_{CMP}=(N*I_M)*R_3$

Because $I_M=I_{M1}=I_{M2}$ and $I_{M2}=I_{Q2}+I_2$, $V_{CMP}=N*(I_{Q2}+I_2)*R_3$ Because $I_{Q2}=(V_{BEQ1}-V_{BEQ2})/R_1=(V_T ln(M_{21}))/R_1$ and $I_2=V_{BEQ1}/R_2$, $V_{CMP}=N*((V_T ln(M_{21}))/R_1+V_{BEQ1}/R_2)*R_3$ (1)

In the above equation (1) $V_T$ is a thermal voltage and $V_T = kT/q$ where k is the Boltzman constant and q is the unit charge. Further, $M_{21}$ is the area ratio between diodes (or transistors) $Q_2$ and $Q_1$. Based on equation (1), the temperature coefficient of $R_1$ and $R_2$ is canceled by the temperature coefficient of $R_3$ because $R_1$ and $R_2$ are in the denominator while $R_3$ is in the numerator. As a result, the temperature coefficient of $V_{CMP}$ depends on that of the terms ($V_T \ln(M_{21})$) and $V_{BEQ1}$, where $\ln(M_{21})$ is the natural log of $M_{21}$. Those skilled in the art will recognize that the temperature coefficient of $V_{BEQ1}$ is negative while the temperature coefficient of ($V_T \ln(M_{21})$) is positive, and they substantially cancel one another, resulting in $V_{CMP}$ having a low or insignificant temperature coefficient. As $V_{CMP}$ has a low or insignificant temperature coefficient, lines $L_{VCMP}$ in FIG. 2 are substantially straight and substantially parallel to one another.

Circuit Providing $V_{CTAT}$ and $V_{CMP}$—2$^{nd}$ Embodiment

Figure 5:
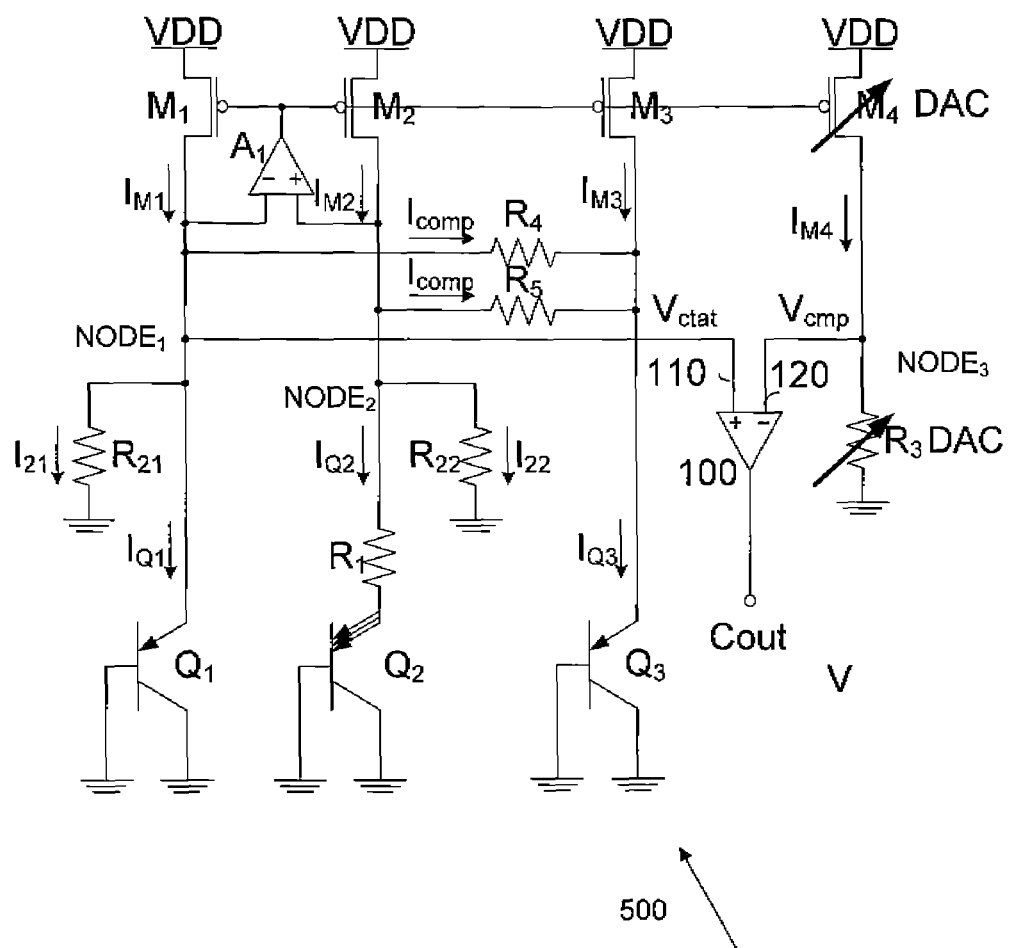
FIG. 5 shows a circuit 500 used to create $V_{CTAT}$ and $V_{CMP}$ in accordance with a second embodiment.

FIG. 5 shows a circuit 500 providing $V_{CTAT}$ and $V_{CMP}$, in accordance with a second embodiment. For illustration purposes, FIG. 5 also includes comparator 100. Similar to circuit 400, circuit 500 includes a negative temperature coefficient circuit component canceling the temperature effect with a positive temperature coefficient circuit component. In addition, circuit 500 also includes additional temperature curvature compensation circuits, and, as a result, $V_{CMP}$, going through circuit 500, results in an even more insignificant temperature coefficient.

Circuit 500 is similar to circuit 400 with the addition of resistors $R_4$, $R_5$, and transistors $M_3$ and $Q_3$ as shown. In the embodiment of FIG. 5 $R_4 = R_5$ and either resistor $R_4$ or $R_5$ therefore may be referred to as resistor $R_{45}$. Transistor $Q_3$ is also configured as a diode similar to transistors $Q_1$ and $Q_2$. Transistor $M_3$ acts as a current mirror wherein current $I_{M3}$ has the same value as current $I_M$ (i.e., $I_{M1}$ or $I_{M2}$). In an embodiment, the area of transistor $Q_3$ is the same as that of transistor $Q_1$.

Similar to circuit 400, because the input impedance to comparator 100 is significantly high, the current on line 120 is negligible. Therefore, at node $NODE_3$ $V_{CMP} = I_{M4} * R_3$ Because $I_{M4} = N*I_M$ $V_{CMP} = (N*I_M) * R_3$ Because $I_M = I_{M1} = I_{M2}$ and $I_{M2} = I_{Q2} + I_2 + I_{COMP}$, $V_{CMP} = N(I_{Q2} + I_2 + I_{COMP}) * R_3$ Because $I_{Q2} = (V_T \ln(M_{21}))/R_1$, $I_2 = V_{BEQ1}/R_2$ and $I_{COMP} = (V_{BEQ1} - V_{BEQ3})/R_4$ or $(V_{BEQ3} - V_{BEQ1})/R_{45}$, $V_{CMP} = N[(V_T \ln(M_{21}))/R_1 + V_{BEQ1}/R_2 + (V_{BEQ1} - V_{BEQ3})/R_{45}] * R_3$ (2)

As discussed above, the term ($V_T \ln(M_{21})$) has positive temperature coefficient, $V_{BEQ1}$ has negative temperature coefficient. Further, $V_{BEQ3} - V_{BEQ1}$ also has positive temperature coefficient. The temperature coefficient of the terms ($V_T \ln(M_{21})$), $V_{BEQ1}$ and $V_{BEQ3} - V_{BEQ1}$ cancels one another, resulting in $V_{CMP}$ with very low or insignificant temperature coefficient.

Those skilled in the art will recognize that, $V_{CMP}$ in equation (2) has a temperature coefficient less than that of $V_{CMP}$ in equation (1). As a result, lines $L_{VCMP}$ in FIG. 2 resulted from circuit 500 are straighter and thus more parallel than lines $L_{VCMP}$ in FIG. 2 resulted from circuit 400. Consequently, line 310 resulted from circuit 500 is straighter than line 310 resulted from circuit 400. In brief, circuit 500 provides a more linear relationship between temperatures T and DAC codes C than circuit 400 does.

Voltage Dependent on Temperature as Proportional to Absolute Temperature ($V_{PTAT}$)

Figure 6:
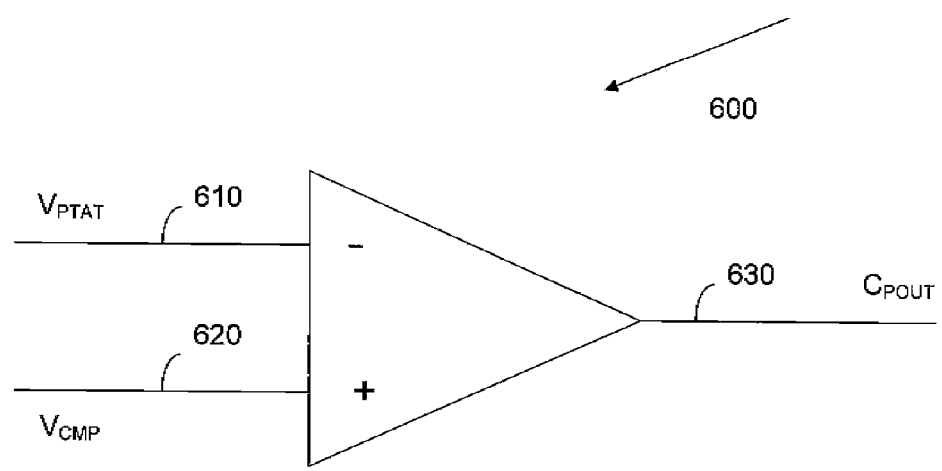
FIG. 6 shows a circuit 600 related to a PTAT-type implementation in accordance with an embodiment.

FIG. 6 shows a comparator 600 in accordance with an embodiment related to a PTAT-type implementation. Reference voltage $V_{PTAT}$ on line 610 is generated by a circuit (e.g., temperature sensing circuit) that will be described below. Similar to comparator 100, comparator 600 compares voltages $V_{CMP}$ and $V_{PTAT}$, and provides resulting signal $C_{POUT}$ on line 630. $V_{CMP}$ in the embodiment of FIG. 6 is similar to that of in the embodiments related to the CTAT-type implementation explained above. $V_{PTAT}$ is a proportional to absolute temperature (PTAT) reference voltage and is generated by the temperature sensing circuit at a particular temperature. For example, similar to the CTAT-type embodiments and in an application, the temperature sensing circuit is embedded as part of a sensor in a semiconductor device, e.g., a CPU. At operation, the CPU experiences a particular temperature (e.g., operational temperature) that is also experienced by the temperature sensing circuit, and $V_{PTAT}$ is generated having this temperature as an input. In some embodiments, if $V_{CMP}$ is slightly higher than (e.g., substantially equal to) $V_{PTAT}$ then signal $C_{POUT}$ is true, e.g., having a high logic. If $V_{CMP}$ is lower than $V_{PTAT}$, then signal $C_{POUT}$ is provided to another circuit (e.g., an adjusting circuit (not shown)) that changes the DAC codes which in turn change $V_{CMP}$ until $V_{CMP}$ is slightly higher than/substantially equal to $V_{PTAT}$. In effect, when $V_{CMP}$ is equal to $V_{PTAT}$, the temperature experienced by the CPU and the temperature sensing circuit, e.g., temperature $T_0$, is also the temperature at which the temperature sensing circuit provides $V_{PTAT}$. Further, this temperature $T_0$ corresponds to a DAC code, e.g., DAC code $C_0$. In various embodiments, the temperatures at which the temperature sensing circuit provides $V_{PTAT}$ and the DAC codes are substantially linearly related. As explained above, those skilled in the art will recognize that when the temperatures and the DAC codes are linearly related, the graph representing their relationship on a two dimensional axis is a straight line.

$V_{PTAT}$, $V_{CMP}$ and Corresponding Temperatures

Figure 7:
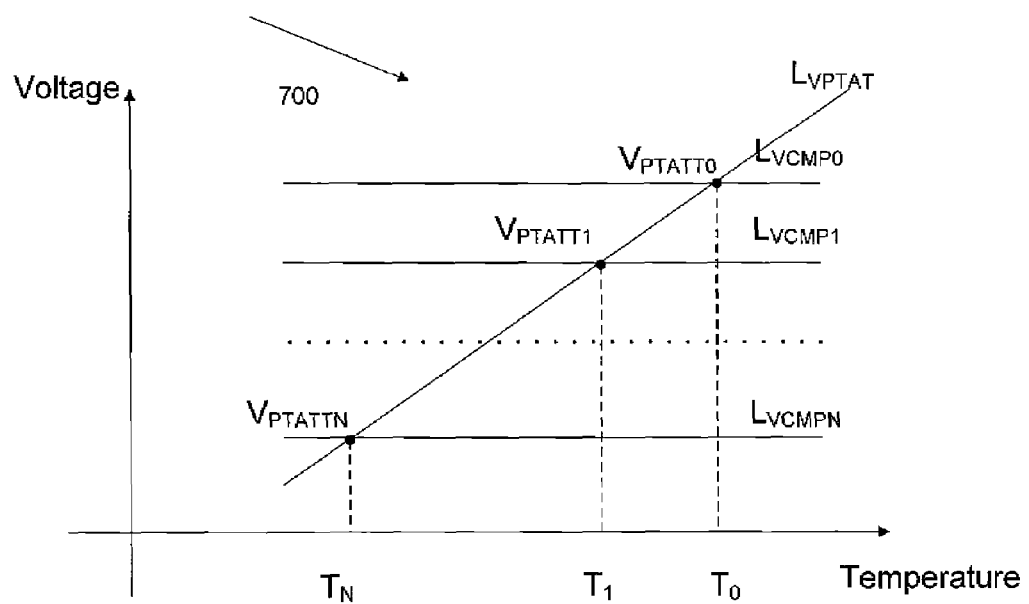
FIG. 7 shows a graph 700 illustrating the relationship between temperature and various voltages in accordance with the PTAT-type embodiments.

FIG. 7 shows a chart 700 illustrating the relationship between $V_{PTAT}$, $V_{CMP}$, and temperatures T, in accordance with an embodiment. As explained in the embodiments related to the CTAT-type implementation, each line $L_{VCMP}$ shows the relationship between a voltage $V_{CMP}$ and temperature T at a particular DAC code serving as an input for $V_{CMP}$ to be generated. Varying the DAC codes from the least significant bit (LSB) to the most significant bit (MSB) provides lines $L_{VCMP}$. In various embodiments, due to the nature of a very small or insignificant temperature coefficient for $V_{CMP}$, lines $L_{VCMP}$ are very close to parallel (e.g., substantially parallel) to one another in addition to being substantially straight. Based on the parallelism of lines $L_{VCMP}$ and their being straight lines, embodiments provide linearity between the temperatures T and the DAC codes.

Line $L_{VPTAT}$ shows the relationship between $V_{PTAT}$ and temperature T. Those skilled in the art will recognize that line $L_{VPTAT}$ has a positive slope and indicates that $V_{PTAT}$ has a positive temperature coefficient. The intersection between line $L_{VPTAT}$ and a line $LV_{CMP}$ indicates that $V_{PTAT}$ equals to $V_{CMP}$ at a particular temperature T that corresponds to a particular DAC code C. For example, point $V_{PTATT0}$ indicates $V_{PTAT}$ equals to $V_{CMP}$ at a temperature $T_0$ that corresponds to a DAC code $C_0$. Similarly, point $V_{PTATT1}$ indicates $V_{PTAT}$ equals to $V_{CMP}$ at a temperature $T_1$ that corresponds to DAC code $C_1$, and $V_{PTATTN}$ indicates $V_{PTAT}$ equals to $V_{CMP}$ at a temperature $T_N$ that corresponds to a DAC code $C_N$, etc. In various embodiments, each point $V_{PTATT}$ corresponds to the result in comparator 600 where $V_{CMP}$ and $V_{PTAT}$ are equal, e.g., when signal $C_{POUT}$ is true, at a particular temperature T experienced by the temperature sensing circuit.

Temperatures and DAC Codes—PTAT-type

Figure 8:
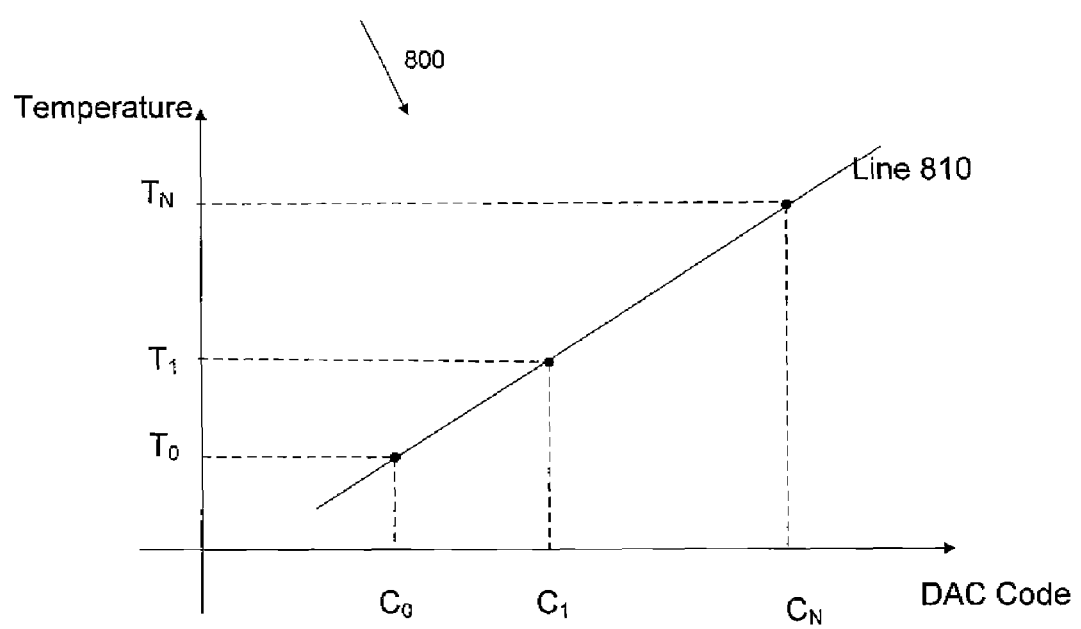
FIG. 8 shows a graph 800 illustrating the relationship between the DAC code and temperature in accordance with the PTAT-type embodiments.

FIG. 8 shows a graph 800 with a line 810 indicating the relationship between temperatures T and DAC codes C related to PTAT. For example, $T_0$ corresponds to code $C_0$, $T_1$ corresponds to code $C_1$, $T_N$ corresponds to code $C_N$, etc.

Embodiments of the disclosure provide the linearity between temperatures T and DAC codes C as much as possible, which is advantageous over prior art approaches that do not provide such linearity. This linearity results from the fact that lines $L_{VCMP}$ in FIG. 7 are substantially straight and substantially parallel to one another. As explained above, in a 100% linearity situation, lines $L_{VCMP}$ are 100% straight and thus 100% parallel to one another, which results in a line 810 being 100% straight. In other approaches lines $L_{VCMP}$ are curved and/or not parallel to one another, which also causes line 810 to be curved. Those skilled in the art will recognize that the less curved the line 810 is, the more linear the relationship between the temperatures T and the DAC codes is. Embodiments of the disclosure are advantageous, especially in high volume manufacturing environment because graph 800, once established, provides the linear relationship between the DAC codes C and temperatures T on line 810. As a result, corresponding temperatures T and DAC codes C can be easily identified. For example, given a DAC code C on the horizontal axis, a corresponding temperature T on the vertical axis can be identified using line 810. Similarly, given a temperature T on the vertical axis, a corresponding DAC code on the horizontal axis can be identified using line 810.

In an application, line 810 can also be easily and economically established in a simple calibration process near room temperature based on the linear relationship between temperatures T and DAC codes C. For example, a temperature sensor embodying a circuit 400 or 500 (e.g., the temperature sensing circuit) with $V_{CTAT}$ being replaced by $V_{PTAT}$ generated by circuit 900 is subject to a first known temperature, e.g., temperature $T_1$. Corresponding to temperature $T_1$, a DAC code, e.g., code $C_1$, is identified. The temperature sensing circuit is then subject to a second known temperature, e.g., temperature $T_2$. Corresponding to temperature $T_2$, a DAC code, e.g., code $C_2$ is identified. Based on the linear relationship between temperatures T and DAC codes C, temperatures $T_1$ and $T_2$, and DAC codes $C_1$ and $C_2$, line 810 can be readily established by various techniques known in the art, and embodiments of the disclosure are not limited to a particular technique. In a further application, for example, line 810, once established, is analyzed to program a control circuit that can regulate temperatures T in a semiconductor chip using embodiments. For example, if a DAC code, e.g., code C75, would be identified at a particular operational moment of the chip, then this code C75 corresponds to a temperature, e.g., temperature T75 at 75° C.

Because this temperature T75 at 75° C. indicates, for example, that the chip is running at 400 MHz and thus generates too much heat, the control circuit is programmed for the chip to run at a slower rate, e.g., 300 MHz to reduce the generated heat. Similarly, if a DAC code, e.g., code C125, is identified, then this code corresponds to a temperature, e.g., temperature T125 at 125° C. Because this temperature T125 at 125° C. can, for example, damage the chip, the control circuit is programmed to shut down the chip when it recognizes code C125. The above examples are used to illustrate applications of the embodiments, and the disclosure is not limited to any particular example.

Circuit Providing $V_{PTAT}$ and $V_{CMP}$

In various embodiments, $V_{CMP}$ related to PTAT-type embodiments is generated similarly to that of $V_{CMP}$ related to CTAT-type, including using circuits 400 and 500 above.

Figure 9:
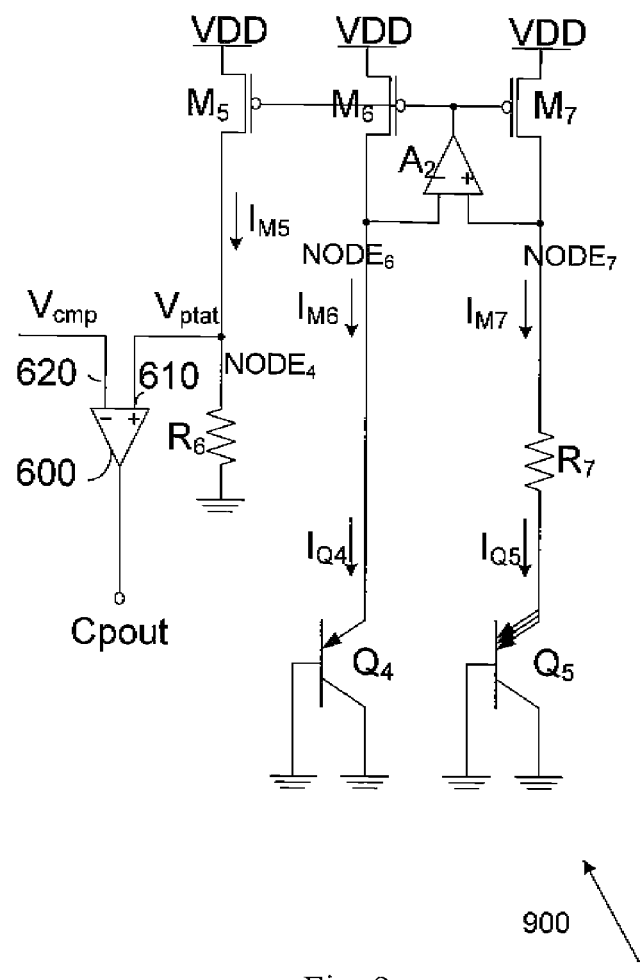
FIG. 9 shows a circuit 900 used to generate $V_{PTAT}$ in accordance with an embodiment.

FIG. 9 shows a circuit 900 used to generate $V_{PTAT}$, in accordance with an embodiment. For illustration purposes, FIG. 9 also includes comparator 600. Circuit 900 is similar to circuit 400 except that circuit 900 does not include resistors corresponding to resistors $R_{21}$ and $R_{22}$. Further, transistors $M_6$ and $M_7$ correspond to transistors $M_1$ and $M_2$ respectively; amplifier $A_2$ corresponds to amplifier $A_1$; resistor $R_7$ corresponds to resistor $R_1$; transistors $Q_4$ and $Q_5$ correspond to transistor $Q_1$ and $Q_2$, respectively. Transistor $M_5$ corresponds to DAC transistors $M_4$ and resistor $R_6$ corresponds to DAC resistors $R_3$. As a result, transistors $M_6$, $M_7$, and amplifier $A_2$ constitute a current mirror wherein amplifier $A_2$ equalizes current $I_{M6}$ and $I_{M7}$ and voltages at $NODE_6$ and $NODE_7$. For illustration purposes, either $I_{M6}$ or $I_{M7}$ may be referred to as $I_{M67}$. Transistor $M_5$ provides a current $I_{M5}$ that mirrors current $I_{M67}$. As a result, at $NODE_4$, because input impedance of comparator 600 is significantly high, the current on line 610 is negligible. As a result, $V_{PTAT} = I_{M5}*R_6$ Because $I_{M5}=I_{M6}=I_{M7}=(V_T \ln(M_{54}))/R_7$ where $M_{54}$ is the area ratio of transistors $Q_5$ and $Q_4$ $V_{PTAT}=((V_T \ln(M_{54}))/R7)*R_6$ Because $V_T=(k*T)/q$ $$V_{PTAT} = ((k*T)\ln(M_{54})/(q*R_7))*R_6 \text{ or} \qquad (3)$$
$$= ((k*R_6)\ln(M_{54})/(q*R_7))*T$$

As seen from equation (3), $V_{PTAT}$ depends on T (or temperature) as proportional to absolute temperature. Similar to the CTAT-type embodiments, circuit 900 in conjunction with circuit 400 and DAC codes as explained above provides a linear relationship between DAC codes and temperatures in relation to $V_{PTAT}$. Further, circuit 900 in conjunction with circuit 500 provides a more linear relationship compared to that of circuit 900 in conjunction with circuit 400.

DAC Transistors and DAC Codes

Figure 10:
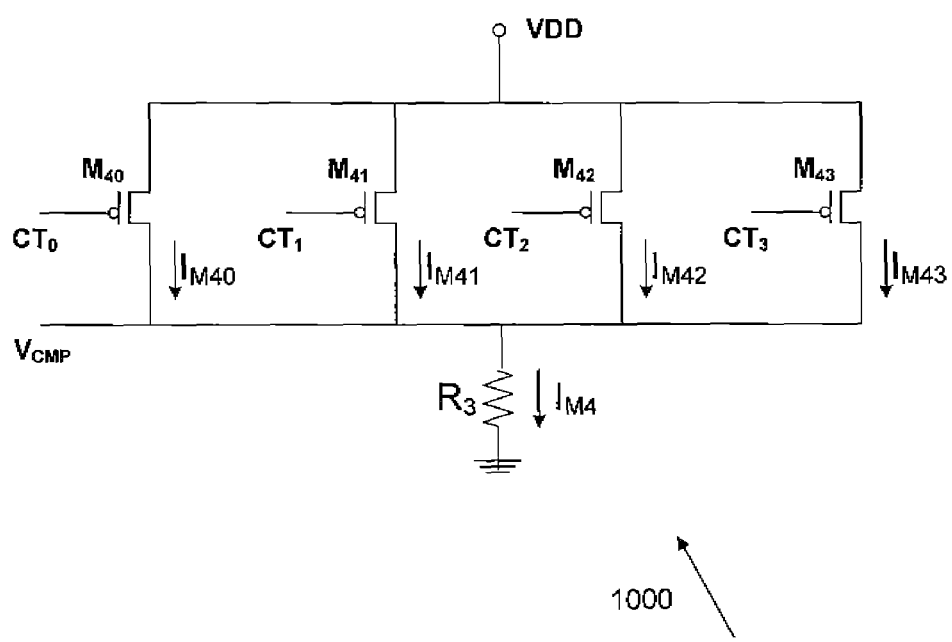
FIG. 10 shows an exemplary circuit 1000 illustrating an implementation of DAC transistors M4.

FIG. 10 shows a circuit 1000 illustrating an implementation example of DAC transistors $M_4$ that provides current $I_{M4}$ (and thus $V_{CMP}$). Circuit 1000 includes four transistors $M_{40}$, $M_{41}$, $M_{42}$, and $M_{43}$, which are controlled (e.g., being turned on or off) by signals $CT_0$, $CT_1$, $CT_2$, and $CT_3$, respectively. For example, to turn each transistor $M_{40}$, $M_{41}$, $M_{42}$, or $M_{43}$ on, each signal $CT_0$, $CT_1$, $CT_2$, or $CT_3$ is activated (e.g., pulled to a low or 0), respectively. Conversely, to turn each transistor $M_{40}$, $M_{41}$, $M_{42}$, or $M_{43}$ off, each signal $CT_0$, $CT_1$, $CT_2$, or $CT_3$ is deactivated (e.g., pulled to a high or 1). Because, in the embodiment of FIG. 10, $I_{M4}=I_{M40}+I_{M41}+I_{M42}+I_{M43}$, a value of current $I_{M4}$ depends on each current $I_{M40}$, $I_{M41}$, $I_{M42}$, and $I_{M43}$. Further, turning on each transistor $M_{40}$, $M_{41}$, $M_{42}$, or $M_{43}$, provides each current $I_{M40}$, $I_{M41}$, $I_{M42}$, or $I_{M43}$ to current $I_{M4}$.

Figure 11:
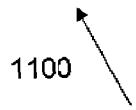
FIG. 11 shows a table 1100 illustrating correspondence between values that can be used as digital codes and the number of transistors $M_4$ in circuit 1000 being turned on or off.

FIG. 11 shows a table 1100 illustrating correspondence between values L and the number of transistors $M_4$ being turned on or off. When L=0, only transistor $M_{40}$ is on. When L=1, transistors $M_{40}$ and $M_{41}$ are on. When L=2, transistors $M_{40}$, $M_{41}$, and $M_{42}$ are on, and when L=3, all transistors $M_{40}$, $M_{41}$, $M_{42}$, and $M_{43}$ are on.

Figure 12:
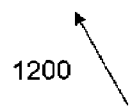
FIG. 12 shows a table 1200 illustrating the relationship between values that can be used as digital codes and signals CT in FIG. 10.

FIG. 12 shows a table 1200 illustrating the relationship between values L and signals CT. Because, when L=0, only transistor $M_{40}$ is on, signal $CT_0$ is low (or 0) while signals $CT_1$, $CT_2$, $CT_3$ are high (or 1). Because when L=1, transistors $M_{40}$ and $M_{41}$ are on, while transistors $M_{42}$ and $M_{43}$ are off, signals $CT_0$ and $CT_1$ are low while signals $CT_2$ and $CT_3$ are high. Because when L=2, transistors $M_{40}$, $M_{41}$, and $M_{42}$ are on, and transistor $M_{43}$ is off, signals $CT_0$, $CT_1$, and $CT_2$ are low while signal $CT_3$ is high. Similarly, because when L=3, all transistors $M_{40}$, $M_{41}$, $M_{42}$, and $M_{43}$ are on, all signals $CT_0$, $CT_1$, $CT_2$, and $CT_3$ are low. Depending on implementations, the values of L or the digital values of signals CT may be considered the digital codes corresponding to DAC currents $I_{M4}$ (or voltage $V_{CMP}$) as explained above. For example, for each value or DAC code L from 0 to 3, there is a corresponding DAC current $I_{M4}$. For another example, for each code 0000, 0001, 0011, or 0111 of signals $CT_0$, $CT_1$, $CT_2$, and $CT_3$ of table 1200, there is a corresponding DAC current $I_{M4}$.

FIGS. 10-12 show four transistors $I_{M4}$, four values of L and four signals CT to correspond to four values of DAC current $I_{M4}$ for illustration purposes only. The disclosure is not limited to four DAC codes, but is applicable to various numbers of DAC codes and various other ways to provide the DAC codes.

A number of embodiments have been described. It will nevertheless be understood that various variations and modifications may be made without departing from the spirit and scope of the invention. For example, even though resistors (resistors $R_1$, $R_2$, etc., and others) are shown in the described embodiments, they may be replaced by a resistive component, a resistive network, or equivalences thereof. Circuits 400 and 500 are used to generate $V_{CMP}$ and $V_{CTAT}$ together, but different circuits may be used to generate $V_{CMP}$ or $V_{CTAT}$ separately. Circuits to generate $V_{CTAT}$ and $V_{PTAT}$ in the embodiments described above are for illustration purposes only, other circuits that provide a voltage complementary to absolute temperature or proportional to absolute temperature as appropriate are within scope of embodiments of the invention. The illustrative embodiments use the term "equal to" or "not equal to," but as long as two elements are close enough to be considered equal (e.g., substantially equal) by a person skilled in the art, they are within scope of embodiments of the invention, etc.

In accordance with an embodiment, a circuit includes a comparator, a first circuit, and a second circuit. The comparator has a first input node and a second input node. The first circuit is configured to output a temperature-dependent voltage at the first input node of the comparator. The first circuit includes a current mirror configured to generate a first reference voltage. The second circuit is configured to output a second reference voltage at the second input node of the comparator responsive to a digital code and the first reference voltage.

In accordance with another embodiment, a circuit includes a comparator, a first circuit, and a second circuit. The comparator has a first input node and a second input node. The first circuit is configured to output a temperature-dependent voltage at the first input node of the comparator. The first circuit includes a current mirror, a first transistor, a second transistor, a first resistive device, and a second resistive device. The current mirror is configured to generate a first reference voltage. The first transistor has a source coupled to a power node, a gate configured to receive the first reference voltage, and a drain. The second transistor has a collector coupled to a reference node, a base coupled to the reference node, and an emitter coupled to the drain of the first transistor. The first resistive device is coupled between a first node of the current mirror and the drain of the first transistor. The second resistive device is coupled between a second node of the current mirror and the drain of the first transistor. The second circuit is configured to output a second reference voltage at the second input node of the comparator responsive to a digital code and the first reference voltage.

In accordance with another embodiment, a circuit includes a comparator, a first circuit, and a second circuit. The comparator has a first input node and a second input node. The first circuit is configured to output a temperature-dependent voltage at the first input node of the comparator. The first circuit includes a current mirror, a first transistor, and a first resistive device. The current mirror is configured to generate a first reference voltage. The first transistor has a source coupled to a power node, a gate configured to receive the first reference voltage, and a drain. The first resistive device is coupled between the drain of the first transistor and a reference node. The second circuit is configured to output a second reference voltage at the second input node of the comparator responsive to a digital code and the first reference voltage.

Each claim in this document constitutes a separate embodiment, and embodiments that combine different claims and/or the above described embodiments are within scope of the invention and will be apparent to those skilled in the art after reviewing this disclosure.

What is claimed is:

1. A circuit comprising:
    a comparator having a first input node and a second input node;
    a first circuit configured to output a temperature-dependent voltage at the first input node of the comparator, the first circuit comprising a current mirror configured to generate a first reference voltage; and
    a second circuit configured to output a second reference voltage at the second input node of the comparator responsive to a digital code and the first reference voltage.

2. The circuit of claim 1, wherein the first circuit is configured to generate a complementary-to-absolute-temperature (CTAT) voltage at the first input node of the comparator.

3. The circuit of claim 1, wherein the current mirror of the first circuit comprises:
    an amplifier having a first input node, a second input node, and an output node;
    a first transistor having a source coupled to a power node, a drain coupled to the first input node of the amplifier, and a gate coupled to the output node of the amplifier; and
    a second transistor having a source coupled to the power node, a drain coupled to the second input node of the amplifier, and a gate coupled to the output node of the amplifier.

4. The circuit of claim 1, wherein the first circuit further comprises:
a first transistor having a collector coupled to a reference node, a base coupled to the reference node, and an emitter coupled to a first node of the current mirror;
a second transistor having a collector coupled to the reference node, a base coupled to the reference node, and an emitter, a size of the second transistor is greater than that of the first transistor by a predetermined ratio; and
a first resistive device coupled between the second node of the current mirror and the emitter of the second transistor.

5. The circuit of claim 4, wherein the first circuit further comprises:
a second resistive device coupled between the first node of the current mirror and the reference node; and
a third resistive device coupled between the second node of the current mirror and the reference node.

6. The circuit of claim 1, wherein the second circuit comprises:
one or more transistors connected in parallel and coupled between the second input node of the comparator and a power node, the one or more transistors having corresponding one or more gates configured to receive the first reference voltage from the current mirror; and
one or more resistive devices connected in parallel and coupled between the second input node of the comparator and a reference node.

7. The circuit of claim 6, wherein the one or more transistors are configured to be turned on responsive to the digital code.

8. The circuit of claim 6, wherein the one or more resistive devices are configured to be electrically decoupled from the second input node of the comparator responsive to the digital code.

9. A circuit comprising:
a comparator having a first input node and a second input node;
a first circuit configured to output a temperature-dependent voltage at the first input node of the comparator, the first circuit comprising:
a current mirror configured to generate a first reference voltage;
a first transistor having a source coupled to a power node, a gate configured to receive the first reference voltage, and a drain;
a second transistor having a collector coupled to a reference node, a base coupled to the reference node, and an emitter coupled to the drain of the first transistor;
a first resistive device coupled between a first node of the current mirror and the drain of the first transistor; and
a second resistive device coupled between a second node of the current mirror and the drain of the first transistor; and
a second circuit configured to output a second reference voltage at the second input node of the comparator responsive to a digital code and the first reference voltage.

10. The circuit of claim 9, wherein the first circuit is configured to generate a complementary-to-absolute-temperature (CTAT) voltage at the first input node of the comparator.

11. The circuit of claim 9, wherein the current mirror of the first circuit comprises:
an amplifier having a first input node, a second input node, and an output node;
a third transistor having a source coupled to a power node, a drain coupled to the first input node of the amplifier, and a gate coupled to the output node of the amplifier; and
a fourth transistor having a source coupled to the power node, a drain coupled to the second input node of the amplifier, and a gate coupled to the output node of the amplifier.

12. The circuit of claim 9, wherein the first circuit further comprises:
a third transistor having a collector coupled to the reference node, a base coupled to the reference node, and an emitter coupled to the first node of the current mirror;
a fourth transistor having a collector coupled to the reference node, the base coupled to the reference node, and an emitter, a size of the fourth transistor is greater than that of the third transistor by a predetermined ratio; and
a third resistive device coupled between the second node of the current mirror and the emitter of the fourth transistor.

13. The circuit of claim 12, wherein the first circuit further comprises:
a fourth resistive device coupled between the first node of the current mirror and the reference node; and
a fifth resistive device coupled between the second node of the current mirror and the reference node.

14. The circuit of claim 9, wherein the second circuit comprises:
a set of parallel-connected transistors coupled between the second input node of the comparator and the power node, the set of parallel-connected transistors having corresponding one or more gates configured to receive the first reference voltage from the current mirror; and
a set of parallel-connected resistive devices coupled between the second input node of the comparator and the reference node.

15. The circuit of claim 14, wherein the set of parallel-connected transistors are configured to be turned on responsive to the digital code.

16. The circuit of claim 14, wherein the set of parallel-connected resistive devices are configured to be electrically decoupled from the second input node of the comparator responsive to the digital code.

17. A circuit comprising:
a comparator having a first input node and a second input node;
a first circuit configured to output a temperature-dependent voltage at the first input node of the comparator, the first circuit comprising:
a current mirror configured to generate a first reference voltage;
a first transistor having a source coupled to a power node, a gate configured to receive the first reference voltage, and a drain; and
a first resistive device coupled between the drain of the first transistor and
a reference node; and
a second circuit configured to output a second reference voltage at the second input node of the comparator responsive to a digital code and the first reference voltage.

18. The circuit of claim 17, wherein the first circuit is configured to generate a proportional-to-absolute-temperature (PTAT) voltage at the first input node of the comparator.

19. The circuit of claim 17, wherein the current mirror of the first circuit comprises:
an amplifier having a first input node, a second input node, and an output node;

a second transistor having a source coupled to the power node, a drain coupled to the first input node of the amplifier, and a gate coupled to the output node of the amplifier; and a third transistor having a source coupled to the power node, a drain coupled to the second input node of the amplifier, and a gate coupled to the output node of the amplifier.

20. The circuit of claim 17, wherein the first circuit further comprises:

a second transistor having a collector coupled to the reference node, a base coupled to the reference node, and an emitter coupled to a first node of the current mirror;

a third transistor having a collector coupled to the reference node, a base coupled to the reference node, and an emitter, a size of the third transistor is greater than that of the second transistor by a predetermined ratio; and a second resistive device coupled between the second node of the current mirror and the emitter of the third transistor.

\* \* \* \* \*